(12) United States Patent
Kaltenbach et al.

(10) Patent No.: US 10,604,000 B2
(45) Date of Patent: Mar. 31, 2020

(54) DRIVE ARRANGEMENT FOR A HYBRID VEHICLE AND POWER TRAIN HAVING SUCH A DRIVE ARRANGEMENT

(71) Applicant: ZF Friedrichshafen AG, Friedrichshafen (DE)

(72) Inventors: Johannes Kaltenbach, Friedrichshafen (DE); Johannes Glückler, Eriskrich (DE); Stefan Renner, Bodman-Ludwigshafen (DE); Rayk Gersten, Friedrichshafen (DE)

(73) Assignee: ZG FRIEDRICHSHAFEN AG, Friedrichshafen (DE)

( * ) Notice: Subject to any disclaimer, the term of this patent is extended or adjusted under 35 U.S.C. 154(b) by 90 days.

(21) Appl. No.: 15/772,989

(22) PCT Filed: Oct. 14, 2016

(86) PCT No.: PCT/EP2016/074695
§ 371 (c)(1),
(2) Date: May 2, 2018

(87) PCT Pub. No.: WO2017/076607
PCT Pub. Date: May 11, 2017

(65) Prior Publication Data
US 2018/0319264 A1    Nov. 8, 2018

(30) Foreign Application Priority Data
Nov. 3, 2015    (DE) .................. 10 2015 221 498

(51) Int. Cl.
*B60K 6/48* (2007.10)
*B60K 6/365* (2007.10)
(Continued)

(52) U.S. Cl.
CPC .............. *B60K 6/365* (2013.01); *B60K 6/387* (2013.01); *B60K 6/48* (2013.01); *B60K 6/547* (2013.01);
(Continued)

(58) Field of Classification Search
None
See application file for complete search history.

(56) References Cited

U.S. PATENT DOCUMENTS 8,684,875 B2    4/2014    Kaltenbach et al.
8,911,315 B2    12/2014    Kaltenbach et al.
(Continued)

FOREIGN PATENT DOCUMENTS

DE    10 2010 063 582 A1    6/2012
DE    10 2011 005 531 A1    9/2012
(Continued)

OTHER PUBLICATIONS

German Search Report Corresponding to 10 2015 221 498.2 dated Jul. 15, 2016.
(Continued)

*Primary Examiner* — Dirk Wright
(74) *Attorney, Agent, or Firm* — Davis & Bujold PLLC; Michael J. Bujold

(57) ABSTRACT

A drive arrangement having combustion and electric engines and a transmission with input shafts (4, 5). The drive arrangement includes first and second planetary gearsets (PG1, PG2), each having a carrier, and sun and ring gears. One element of gearset (PG1) is rotationally fixed to shaft (5). Another element of gearset (PG1) is fixed to a housing. One element of gearset (PG2) is connected to the electric engine. Another element of gearset (PG2) is rotationally fixable to shaft (4). When a first switching element is engaged, a further element of gearset (PG2) is fixed to the
(Continued)

housing. When a second switching element is engaged, the further element of gearset (PG2) is rotationally fixed to shaft (5), to which the element of gearset (PG1) is also rotationally fixed. When a third switching element is engaged, the further element of gearset (PG2) is rotationally fixed to a further element of gearset (PG1).

16 Claims, 3 Drawing Sheets

(51) Int. Cl.
```
B60K 6/387    (2007.10)
B60K 6/547    (2007.10)
F16H 37/04    (2006.01)
F16H 3/00     (2006.01)
F16H 3/66     (2006.01)
F16H 3/72     (2006.01)
F16H 37/06    (2006.01)
```
(52) U.S. Cl.
CPC .............. *F16H 3/006* (2013.01); *F16H 3/66* (2013.01); *F16H 3/724* (2013.01); *F16H 37/046* (2013.01); *F16H 37/065* (2013.01); *B60K 2006/4816* (2013.01); *B60Y 2200/92* (2013.01); *B60Y 2300/18033* (2013.01); *B60Y 2400/71* (2013.01); *F16H 2003/007* (2013.01); *F16H 2200/2007* (2013.01); *F16H 2200/2038* (2013.01); *F16H 2200/2097* (2013.01); *Y02T 10/6221* (2013.01); *Y02T 10/6256* (2013.01)

(56) References Cited

U.S. PATENT DOCUMENTS

| | | | |
|---|---|---|---|
| 9,677,655 B2* | 6/2017 | Matsubara | B60K 6/387 |
| 9,944,164 B2* | 4/2018 | Kanada | B60K 6/365 |
| 9,945,448 B2* | 4/2018 | Lindstrom | B60K 1/02 |
| 9,975,545 B2* | 5/2018 | Banshoya | B60K 6/365 |
| 2007/0099738 A1 | 5/2007 | Holmes | |
| 2016/0230850 A1* | 8/2016 | Kanada | B60K 6/365 |
| 2019/0031016 A1* | 1/2019 | Gluckler | B60K 6/365 |
| 2019/0084553 A1* | 3/2019 | Yamamoto | B60W 10/08 |

FOREIGN PATENT DOCUMENTS

| | | |
|---|---|---|
| EP | 2 161 154 A1 | 3/2010 |
| WO | 2015/142265 A1 | 9/2015 |
| WO | 2015/142266 A1 | 9/2015 |

OTHER PUBLICATIONS

International Search Report Corresponding to PCT/EP2016/074695 dated Dec. 16, 2016.
Written Opinion Corresponding to PCT/EP2016/074695 dated Dec. 16, 2016.

* cited by examiner

2

DRIVE ARRANGEMENT FOR A HYBRID VEHICLE AND POWER TRAIN HAVING SUCH A DRIVE ARRANGEMENT

This application is a National Stage completion of PCT/EP2016/074695 filed Oct. 14, 2016, which claims priority from German patent application serial no. 10 2015 221 498.2 filed Nov. 3, 2015.

FIELD OF THE INVENTION

The invention relates to a drive arrangement for a hybrid vehicle. The invention furthermore relates to a drive train with such a drive arrangement.

BACKGROUND OF THE INVENTION

Hybrid vehicles with hybrid drives are known from the prior art.

Hybrid drives have two or more different drive sources, while drive trains with a combustion engine and one or more electric engines as parallel hybrids or as mixed hybrids have gained broad acceptance. These variants have in the force flow a substantially parallel arrangement of the combustion engine and the electric engine and thus permit both an overlaying of the driving torque and an activation with solely combustion engine drive or solely electric engine drive.

Hybrid vehicles have a transmission in addition to the hybrid drive.

A transmission refers particularly to a multi-gear transmission, in which a plurality of gears, in other words, fixed gear ratios between two shafts of the transmission, can be switched, preferably in an automated manner, by means of switching elements. Such transmissions have applications mainly in motor vehicles, in particular also in commercial vehicles, in order to suitably adapt the speed- and torque output characteristics of the drive unit to the driving resistance of the vehicle.

Document DE 10 2010 063 582 A1 made known a drive arrangement for a hybrid vehicle, with a planetary gearset having the elements carrier, sun gear and ring gear, wherein a first element of these elements of the planetary gearset serves to firmly connect a first transmission input shaft of a first partial gear of a transmission, and wherein a second element of these elements of the planetary gearset serves to firmly connect an electric engine of a hybrid drive.

The drive arrangement of document DE 10 2010 063 582 A1 additionally has a first switching element, by means of which a third element of these elements of the planetary gearset, in a first switching position of the first switching element, can be connected to a second gear input shaft of a second partial gear of the transmission, to which a combustion engine of the hybrid drive can additionally be coupled, and in a second switching position of the first switching element at the housing side or the stator side.

The drive arrangement of document DE 10 2010 063 582 A1 furthermore has a second switching element, by means of which, in the case of a closed second switching element, both gear input shafts of both partial gears can be coupled to one another and, in the case of an opened second switching element, both gear input shafts of both partial gears can be separated from each other. This permits an electrodynamic start-up and also electrodynamic switching. The electric engine can also be used as a starter generator.

SUMMARY OF THE INVENTION

Based on the prior art, the problem addressed is to provide a drive arrangement for a hybrid vehicle, which, in a simple and cost-efficient manner, permits reverse driving, in particular reverse driving in hybrid operation with provision of a driving torque also via the combustion engine.

Furthermore, a drive train for a hybrid vehicle with such a drive arrangement is to be provided, in particular with an automated load-switchable manual transmission, which combines the various advantages of existing manual transmissions and employs them in such a way that a drive train with this transmission is created with little constructive effort and a high degree of efficiency, which specifically has a spread and gradation for trucks.

This problem is solved by means of a drive arrangement according to the claims.

The drive arrangement comprises at least a first planetary gearset, a second planetary gearset and at least three switching elements.

The first planetary gearset has the elements of a carrier, a sun gear and a ring gear, wherein a first element of the first planetary gearset can be connected in a rotationally fixed manner to one of the transmission input shafts, and wherein a second element of the first planetary gearset can be connected in a housing-fixed manner. The second planetary gearset likewise has the elements of a carrier, a sun gear and a ring gear, wherein a first element of the second planetary gearset can be connected in a rotationally fixed manner to the electric engine, and wherein a second element of the second planetary gearset can be connected in a rotationally fixed manner to another of the transmission input shafts. When a first switching element is closed, a third element of the second planetary gearset is connected in a housing-fixed manner. When a second switching element is closed, the third element of the second planetary gearset is connected in a rotationally fixed manner to the transmission input shaft, to which the first element of the first planetary gearset is also connected in a rotationally fixed manner. When a third switching element is closed, the third element of the second planetary gearset is connected in a rotationally fixed manner to a third element of the first planetary gearset.

The drive arrangement according to the invention is in principle independent of the specific gear set of the transmission of the hybrid vehicle. The drive arrangement comprises at least the two planetary gearsets and the three switching elements, with purely electric driving being possible when the first switching element is closed, and with forward driving being possible when the second switching element is closed with the cooperation of the combustion engine in a so-called EDSU operation mode, and with reverse driving being possible when the third switching element is closed, likewise with the cooperation of the combustion engine and again in the EDSU operation mode. The invention thus permits reverse driving with the cooperation of the combustion engine, and specifically using the drive arrangement according to the invention independently of the specific gear set of the transmission.

The first switching element and the second switching element and the third switching element are preferably activatable via a common actuator in such a way that only one of these switching elements is always closed.

This design of the invention is simple in terms of construction and is cost-efficient and therefore preferred. A single actuator is sufficient for the three switching elements. Only one of these three switching elements is always closed. Furthermore, all three switching elements can also be opened, in particular in order to synchronize switching elements to be engaged on the electric engine.

According to a first further development of the invention, the first switch element and the second switching element and the third switching element are arranged such that the second switching element is arranged between the first switching element and the third switching element.

According to a second, alternative further development, the first switching element and the second switching element and the third switching element are arranged such that the first switching element is arranged between the second switching element and the third switching element.

The second further development of the invention is preferred, because in this second further development the two switching elements, which in the closed switching position ensure the forward driving and the backwards driving in EDSU operation mode, are separated by that switching element which in the closed switching position permits the purely electric driving. When this first switching element is closed, the electric engine at a vehicle standstill has a speed of zero. During the change from a closed second switching element for the forward driving in the EDSU operation mode to a closed third switching element for reverse driving in the EDSU operation mode, according to the second further development the closed switching position of the first switching element must therefore be passed through, in which the electric engine at a vehicle standstill then has a speed of zero, so that, without synchronization effort for the second switching element, it can be switched through in the zero passage of the speed.

The drive train according to the invention is defined in the claims.

The drive arrangement is particularly preferably used in a drive train, the transmission of which comprises a main gear comprising two parallel connected partial gears with both the transmission input shaft and the output shaft, wherein the main gear, comprises a first gear plane, a second gear plane, a third gear plane, a fourth gear plane and a fifth gear plane, wherein the transmission comprises a first double switching element, a second double switching element, a third double switching element, a fourth double switching element and a fifth double switching element, wherein the transmission comprises an additional planetary gearset, which as a range group is connected to the main transmission in such a way that the fourth double switching element, in the case of a closed switching element of the fourth double switching element, connects in a rotationally fixed manner the fifth gear plane and a first element of the additional planetary gearset and, in the case of another closed switching element of the fourth double switching element, connects the fifth gear plane of the main gear with a main shaft of the transmission, and such that the fifth double switching element couples a second element of the additional planetary gearset in the case of a closed switching element of the fifth double switching element to the output shaft and, in the case of another closed switching element of the fifth double switching element locks in a housing-fixed manner, wherein a third element of the additional planetary gearset is coupled in a rotationally fixed manner on the main shaft of the transmission. A hybrid vehicle, which combines the drive arrangement according to the invention with such a transmission, is particularly preferred. Different advantages of existing manual transmissions can be combined, in particular gears are fully load switchable, with a spread and gradation being able to be obtained with little constructive effort and with a high degree of efficiency, which is particularly suitable for trucks.

BRIEF DESCRIPTION OF THE DRAWINGS

Preferred further developments will emerge from the dependent claims and the description below. Exemplary embodiments of the invention are explained in detail with reference to the drawings without being restricted thereto. Said drawings show:

DETAILED DESCRIPTION OF THE PREFERRED EMBODIMENTS

The present invention relates to a drive arrangement for a hybrid vehicle and a hybrid vehicle with such a drive arrangement and a transmission.

Figure 1:
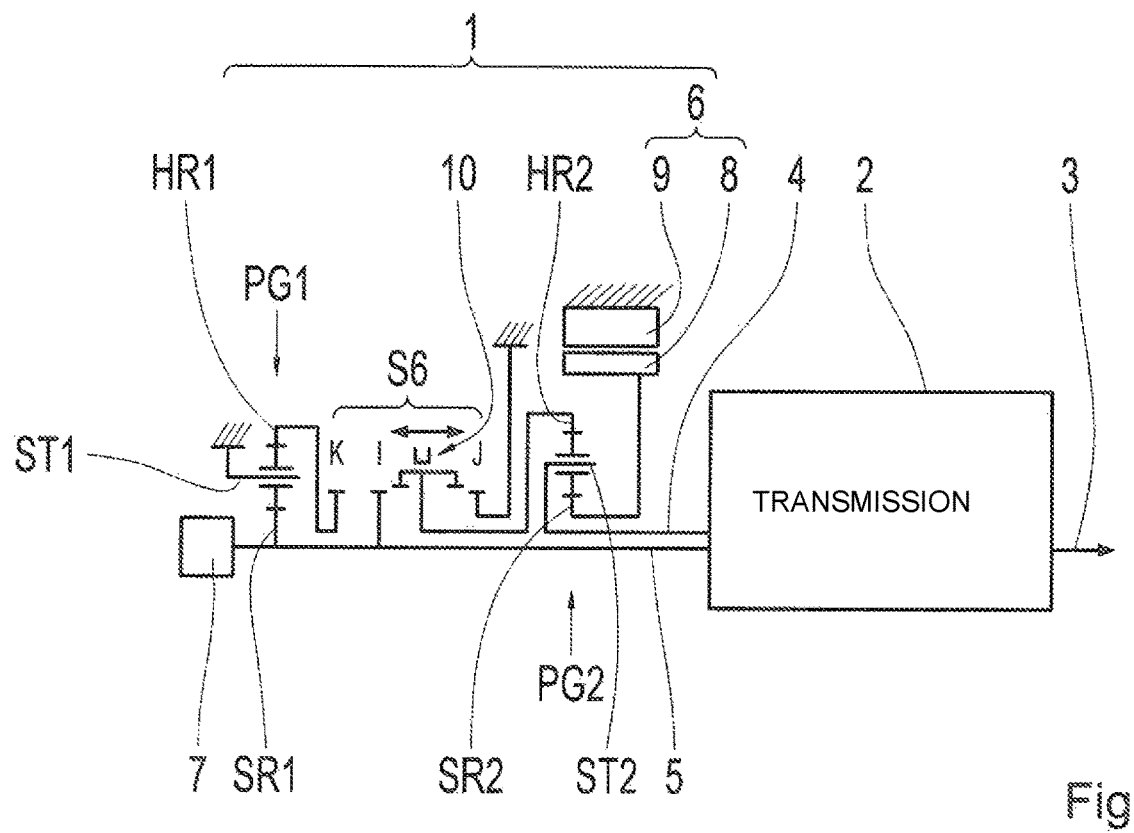
FIG. 1 a diagram of a first drive arrangement according to the invention.

FIG. 1 shows a first exemplary embodiment of a drive arrangement 1 according to the invention together with a transmission 2 depicted as a block, with the transmission 2 components shown being an output shaft 3 and two transmission input shafts 4, 5. The drive arrangement 1 according to the invention is switched between the transmission 2, namely the transmission input shafts 4, 5 of the transmission 2 and a hybrid drive of a hybrid vehicle, with the hybrid drive components shown in FIG. 1 being an electric engine 6 and a combustion engine 7. The combustion engine 7 in FIG. 1 is directly coupled in a rotationally fixed manner, in other words, without an interposed separating clutch or starting clutch, to one of the transmission input shafts, namely to the transmission input shaft 5. Although such a separating clutch or starting clutch can be dispensed with, it is also possible to connect a separating clutch or starting clutch 15 between the transmission input shaft 5 and the combustion engine 7 as diagrammatically shown in FIG. 4.

The drive arrangement according to the invention for a hybrid vehicle comprises a first planetary gearset PG1 with the elements of a carrier ST1, a sun gear SR1 and a ring gear HR1. The drive arrangement 1 according to the invention furthermore comprises a second planetary gearset PG2, again with the elements of a carrier ST2, a sun gear SR2 and a ring gear HR2.

A first element of the first planetary gearset PG1, in FIG. 1 the sun gear SR1, can be or is connected in a rotationally fixed manner to one of the transmission input shafts, and specifically to that transmission input shaft 5, to which also the combustion engine 7, namely a drive shaft of same, can be connected in a rotationally fixed manner in particular permanently without any interposed separating clutch. A second element of the first planetary gearset PG1, in the exemplary embodiment of FIG. 1 the carrier ST1, is connected in a housing-fixed manner.

A first element of the second planetary gearset PG2, in FIG. 1 the sun gear SR2, is connected in a rotationally fixed manner to the electric engine 6, namely to a rotor or armature 8 of the electric engine 6. A stator or stand 9 of the electric engine 6 is connected in a housing-fixed manner.

A second element of the second planetary gearset PG2, in the exemplary embodiment of FIG. 1 the carrier ST2, is connected in a permanent and rotationally fixed manner to the other transmission input shaft of the transmission 2, namely to the transmission input shaft 4.

In addition to the two planetary gearsets PG1 and PG2, the drive arrangement 1 according to the invention comprises at least three switching elements K, I and J.

When a first switching element J of the drive arrangement 1 is closed, a third element of the second planetary gearset PG2, in the depicted exemplary embodiment of FIG. 1 the ring gear HR2, is connected in a housing-fixed manner.

However, when a second switching element I of the drive arrangement 1 is closed, the third element of the second planetary gearset PG2, in FIG. 1 the ring gear HR2, is connected in a rotationally fixed manner to that transmission input shaft 5 of the transmission 2 to which the first element, in FIG. 1 the sun gear SR1, of the first planetary gearset PG1, is also connected in a rotationally fixed manner.

If, however, the third switching element K of the drive arrangement 1 is closed, then the third element of the second planetary gearset, in FIG. 1 the ring gear HR2, is connected in a rotationally fixed manner to a third element of the first planetary gearset PG1, in FIG. 1 to the ring gear HR1.

When the first switching element J is closed, in other words, when in FIG. 1 the ring gear HR2 of the second planetary gearset PG2 is connected in a housing-fixed manner, purely electric driving is in particular possible in the ISG operating mode.

When the second switching element I is closed, in other words when the ring gear HR2 of the second planetary gearset PG2 is connected to the transmission input shaft 5, forward driving is possible with the cooperation of the combustion engine 7 in particular in a so-called EDSU operating mode.

When the third switching element K is closed, in other words, when the two ring gears HR1 and HR2 of the two planetary gearsets PG1 and PG2 are connected, reverse driving is possible in particular in the EDSU operating mode with the cooperation of the combustion engine 7.

The first planetary gearset PG1 accordingly serves as an inverter stage, during which the sun gear SR1 is driven by the combustion engine 7, during which the carrier ST1 is connected in a housing-fixed manner, and during which the ring gear HR1 turns backwards.

In the embodiment of the drive arrangement 1 shown in FIG. 1 the three switching elements J, I and K can be activated via a common actuator 10, the three switching elements J, I and K are thus combined to form a three-way switching element S6. In this preferred embodiment accordingly only one of the three switching elements J, I and K can always be closed, however it is also possible that all three switching elements J, I and K are opened.

In FIG. 1 the three switching elements J, I and K of the drive arrangement 1 are arranged in such a way that the second switching element I is arranged between the first switching element J and the third switching element K. Starting from a closed switching element position of the first switching element J accordingly firstly a closed switching element position of the second switching element I must be passed through, before a closed switching element position of the third switching element K can be reached. A neutral switching element position or neutral position is thereby realized on the one hand between the closed switching element position of the first switching element J and the closed switching element position of the second switching element I and on the other hand between the closed switching element position I and the closed switching element position K.

The neutral position between the switching elements I and J and the neutral position between the switching elements I and K is required, in order to synchronize, in particular via the electric engine 6, a speed on a switching element to be engaged of the three switching elements J, I and K.

In the exemplary embodiment depicted in FIG. 1 for the switching elements K, I and J combined to form the three-way switching element S6 five switching element positions are thus available, namely three closed switching element positions and two neutral positions.

Figure 2:
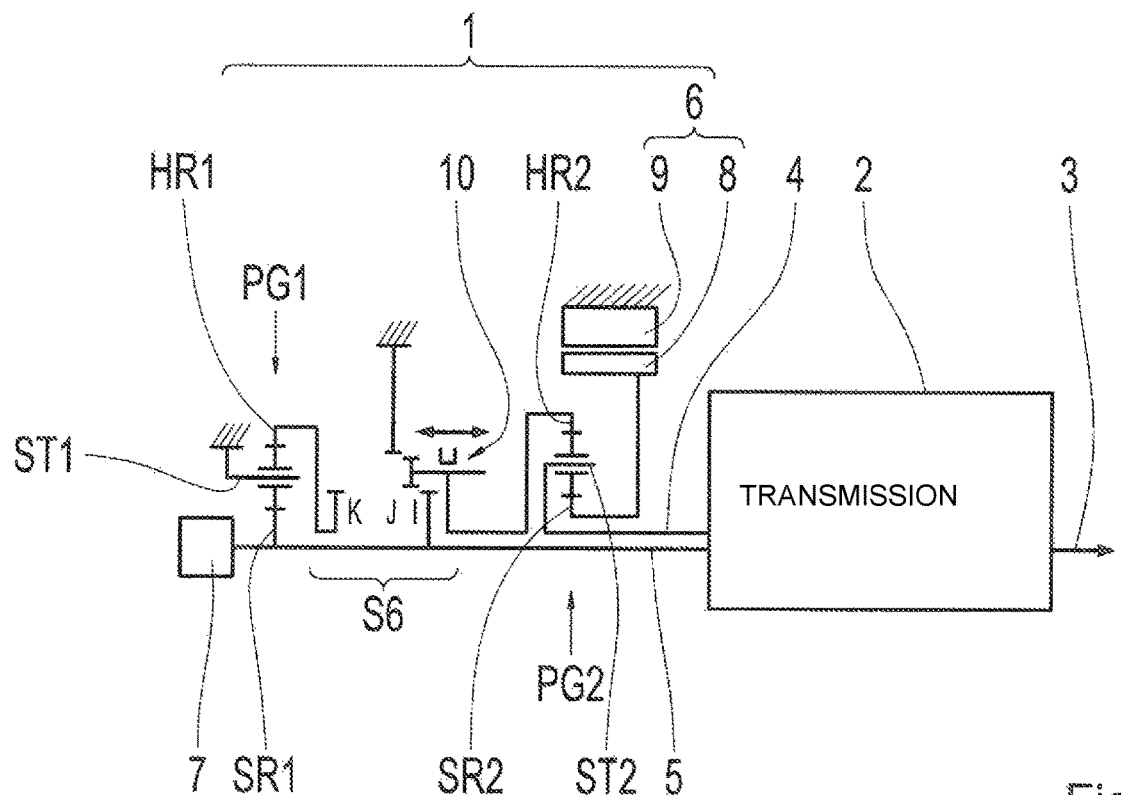
FIG. 2 a diagram of a second drive arrangement according to the invention.

FIG. 2 shows a second drive arrangement 1 according to the invention, which differs from the drive arrangement 1 depicted in FIG. 1 through the relative position of the three switching elements I, J and K. With respect to the other details, the drive arrangement of FIG. 1 corresponds to the drive arrangement of FIG. 2, so that in order to avoid unnecessary repetition identical reference numerals are used for identical components and with respect to the exemplary embodiment of FIG. 2 reference is made to the statements regarding the exemplary embodiment of FIG. 1.

In the exemplary embodiment of FIG. 2 the three switching elements I, J and K are arranged such that the first switching element J is positioned between the second switching element I and the third switching element K, so that thus starting from a closed switching element position of the second switching element I firstly a closed switching element position of the first switching element J must be passed through, before a closed switching element position of the third switching element K can be reached. This has the advantage that, when changing between forwards driving and reverse driving with the cooperation of the combustion engine in the so-called EDSU operating mode, which is provided by the closed switching element positions of the second switching element I and of the third switching element K, the closed switching element position of the first switching element J must always be passed through.

In the case of the closed switching element position of the second switching element J at a vehicle standstill the electric engine in any case has a speed of zero, so that when changing between forwards driving with a closed second switching element I and reverse driving with a closed third switching element K the corresponding switching can be carried out without additional synchronization effort for the first switching element J.

Both variants of FIGS. 1 and 2 have in common that in a vehicle standstill the electric engine 6 has a speed of zero, and thus also the transmission input shaft 4, whereas the combustion engine 7 runs at idle. The ring gear HR1 of the first planetary gearset PG1 then continuously rotates backwards at a relatively low speed. When the third switching element K is closed in this situation, the ring gear HR2 of the second planetary gearset PG2 likewise rotates backwards relatively slowly, and the electric engine 6 then rotates forwards in order to compensate. When, however, in this situation the first switching element J is closed, the electric engine 6 is at a standstill due to the housing-fixed connection of the ring gear HR2 of the planetary gearset PG2. If the second switching element I is closed in this situation however, the ring gear HR2 of the second planetary gearset PG2 rotates forwards, with the electric engine 6 then rotating backwards in order to compensate. In the case of a change between the closed switching element positions of the switching elements I, J and K a differential speed can be actively synchronized at the switching element to be engaged with the help of the electric engine 6. The switchover always takes place in a tractive force-interrupted manner. In the variant of FIG. 2 however, for switchover between the closed switching element positions of the switching elements I and K the first switching element J can be switched through without synchronization effort in the zero passage.

Figure 3:
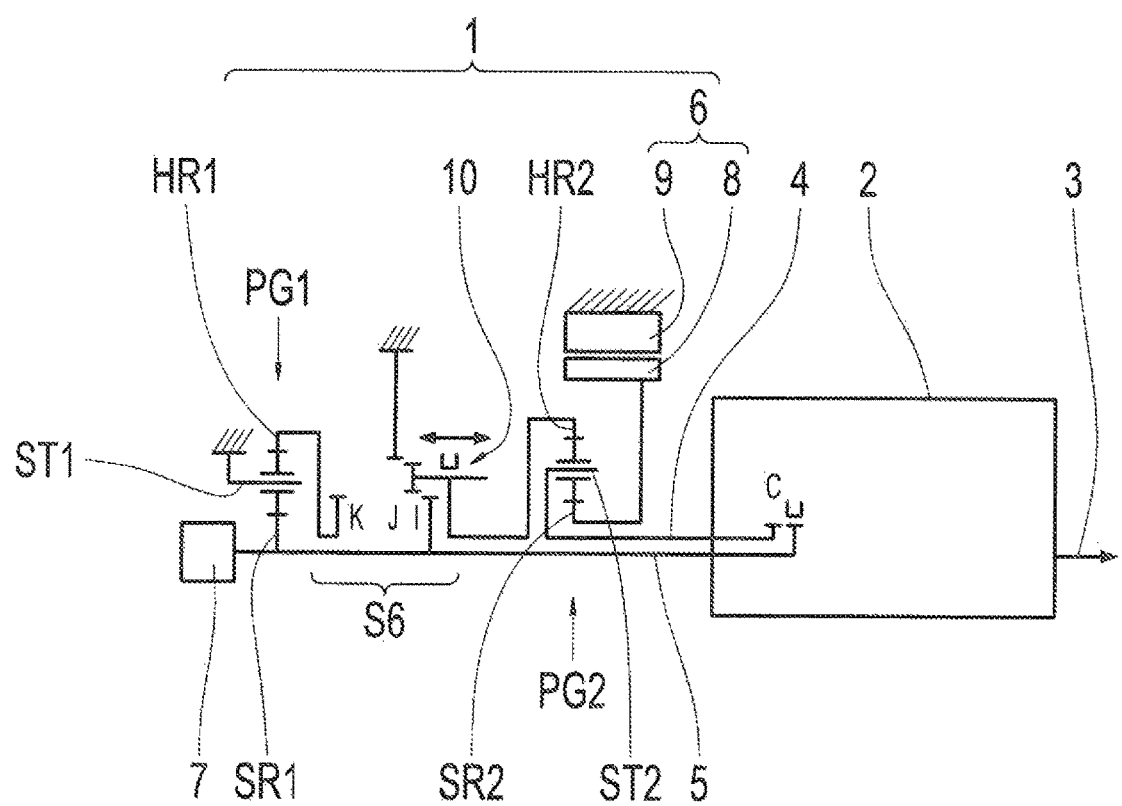
FIG. 3 a diagram of a third drive arrangement according to the invention.

Another design of a drive arrangement 1 according to the invention is shown in FIG. 3, with the drive arrangement 1 of FIG. 3 constituting a further development of the drive arrangement 1 of FIG. 2. For that reason, the following will use identical reference numerals for identical components and to avoid unnecessary repetition with respect to the drive arrangement of FIG. 3 reference is made to the statements regarding the drive arrangement of FIG. 2 and thus also of FIG. 1.

The drive arrangement 1 of FIG. 3 has, in addition to the two planetary gearsets PG1 and PG2 and in addition to the three switching elements J, I and K, an additional switching element C, which is designed as a coupler switching element. When this fourth switching element C is closed, the two transmission input shafts 4 and 5 of the transmission 2 are coupled to one another in a rotationally fixed manner, while when this switching element C is open, the two transmission input shafts 4 and 5 are not coupled to one another in a rotationally fixed manner. By means of the fourth switching element C, the combustion engine 7 can also use those gears of the transmission 2 that are assigned to the transmission input shaft 4, in order to thus provide mechanical forwards gears.

In FIG. 3 the fourth switching element C is depicted inside the transmission 2, in other words it is designed as a transmission-internal switching element. It is however also possible that this fourth switching element C is positioned outside the transmission 2, in other words it is designed as a transmission-external switching element.

As already stated in connection with FIG. 1, between the combustion engine 7 and the transmission input shaft 5 cooperating with the combustion engine 7 a separating clutch or starting clutch may be connected. Such a separating clutch or starting clutch is however advantageously dispensed with in order to reduce the number of components.

Although the interconnection shown in FIGS. 1 to 3 of the respective three elements of the two planetary gearsets PG1, PG2 with the transmission input shafts 4, 5 and the switching elements J, I and K is preferred, a different connection of the planetary gearsets is also possible. Thus in the second planetary gearset PG2 the electric engine 6 can also engage the ring gear HR2 and the sun gear SR2 can be switched via the switching elements J, I and K.

Furthermore, an extra gear set can be used for the planetary gearsets PG1 and PG2, in order to reduce other transmission ratios.

Furthermore, in the case of the planetary gearset PG1 a different coupling of the three elements thereof can be used, for example in conjunction with an extra planetary set for the planetary gearset PG1, in which the ring gear HR1 is then connected in a housing-fixed manner, the sun gear SR1 can be switched to the transmission input shaft 5 and the carrier SR1 can be switched via the switching elements K, I and J.

In the drive arrangements according to the invention an additional brake can be provided as a conventional starting element for start-up in forwards driving and reverse driving on the transmission input shaft 4, which cooperates with the electric engine 6. By means of such a starting element a dynamic torque support can be supported or replaced by the electric engine 6, both for a forwards driving with a closed second switching element I and for a reverse driving with a closed third switching element K.

It is furthermore possible to assign to the second planetary gearset PG2 an additional switching element, by means of which the second planetary gearset PG2 can be locked, so that it is operated in lock circulation with the same speed of the sun gear SR2, carrier ST2 and ring gear HR2. This makes it possible to provide mechanical reverse gears without necessary torque support from the electric engine. Such a lock-up clutch can be designed as a friction clutch and can serve as a conventional starting element for starting in forwards driving and starting in reverse driving.

As stated above, the drive arrangement 1 according to the invention which is described with reference to FIGS. 1 to 3 is in principle independent of the specific gear set of the gear 2.

Figure 4:
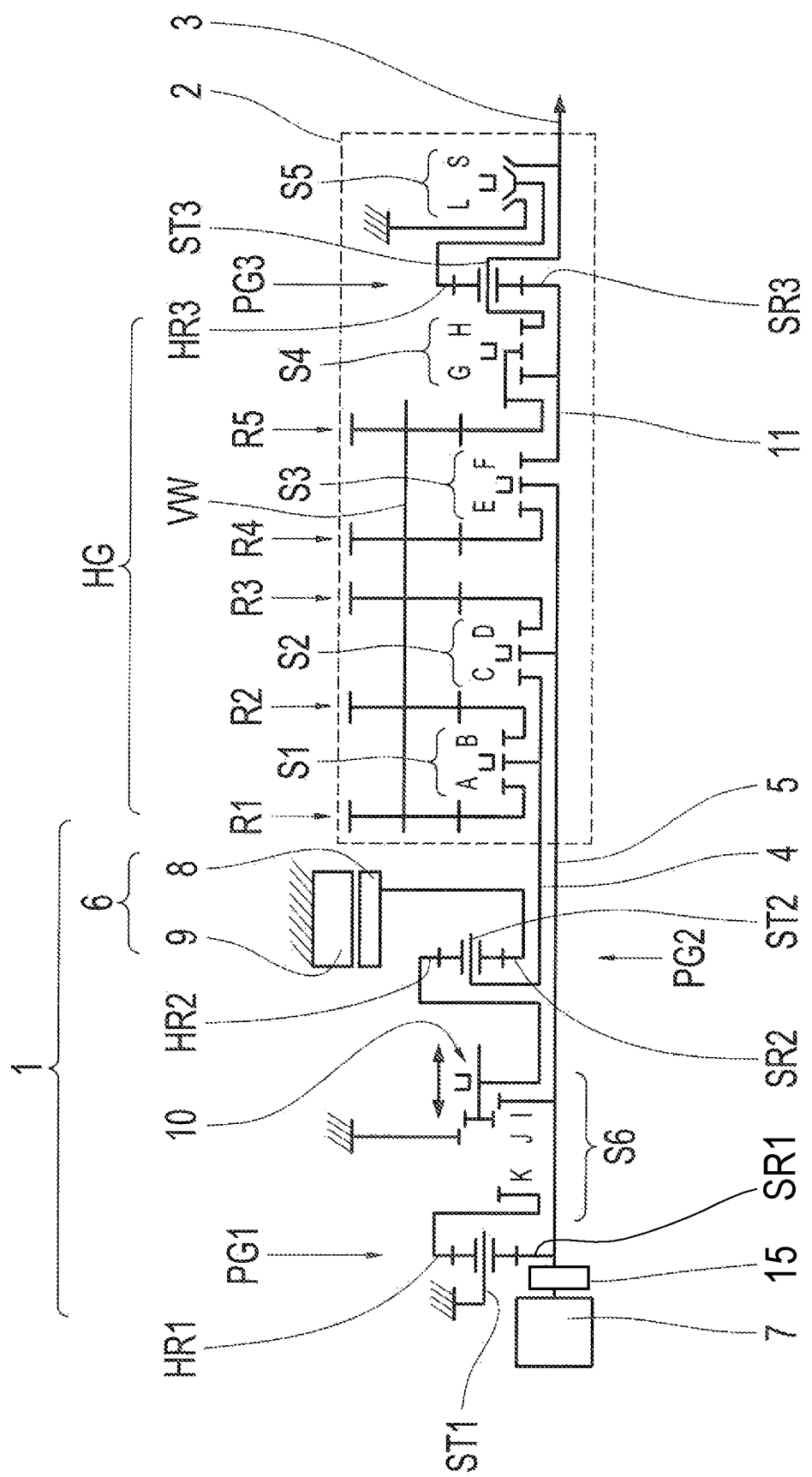
FIG. 4 the drive arrangement of FIG. 3 in combination with a preferred transmission.

However, said drive arrangement particularly preferably is used with the gear set shown in FIG. 4 of a gear 2 in order to provide, with little construction effort and with a high degree of efficiency, specifically a spread and gradation for trucks with automated load-switchable gears in the transmission 2.

FIG. 4 thus shows the preferred embodiment of the transmission 2 together with the drive arrangement 1 according to the invention. The transmission 2 comprises a 5-gear main gear HG, which has two partial gears, and an additional planetary gearset PG3 with the elements of a carrier ST3, a sun gear SR3 and a ring gear HR3. The additional planetary gearset PG3 is used as a range group and is connected to the main group HG. The first transmission input shaft 4 is designed as a hollow shaft and is assigned to a first partial gear of the main gear HG. A second transmission input shaft 5 is designed as a solid shaft and is assigned to the second partial gear of the main gear HG.

The main gear HG comprises a first gear plane R1, a second gear plane R2, a third gear plane R3, a fourth gear plane R4 and a fifth gear plane R5 as well as a first double switching element S1 with the switching elements A and B, a second double switching element S2 with the switching elements C and D, a third double switching element S3 with the switching elements E and F and a fourth double switching element S4 with the switching elements G and H.

The fifth gear plane R5 forms the output constant of the main gear HG.

All of the double switching elements S1 to S4 of the main gear HG can be connected by two different elements of the transmission 1 with a shaft or a gear component.

The first gear plane R1 is formed by a first idler gear of the first transmission input shaft 4 with a first fixed gear of a countershaft VW. The second gear plane R2 is formed by an idler gear of the first transmission input shaft 4 with a second fixed gear of the countershaft VW. The third gear plane R3 is formed by a third idler gear on the second transmission input shaft and a third fixed gear of the countershaft VW. The fourth gear plane R4 is formed by a fourth idler gear on the second transmission input shaft 5 and a fourth fixed gear on the countershaft VW. The fifth gear plane R5 is formed by a fifth idler gear on a main shaft 11 and a fifth fixed gear on the countershaft VW.

The main shaft 11 extends coaxial to the transmission input shaft 4, 5 and the output shaft 3 and lies between the second transmission input shaft 5 and the countershaft VW and extends parallel to the axis of the transmission input shafts 4, 5, of the main shaft 11 and the output shaft 3. The first double switching element S1 can, in the case of a closed switching element A, connect the first gear plane R1, or, in the case of a closed switching element B, connect the second gear plane R2 to the first transmission input shaft 4. The second double switching element S2 can, in the case of a closed switching element C, connect the first transmission input shaft 4 or, in the case of a closed switching element D, connect the third gear plane R3 to the second transmission input shaft 5. The second double switching element S2 thus serves as a partial gear clutch in the case of a closed switching element C. The third double switching element S3 can, in the case of a closed switching element E, couple the fourth gear plane R4, or, in the case of a closed switching element F, couple the main shaft 11 to the second transmission input shaft 5. In the case of a closed switching element F, a direct gear can thus be switched, wherein torque from the second transmission input shaft 5 is transmitted via the main shaft 11 and the planetary gearset PG3 to the output shaft 3. The fourth double switching element S4 can, in the case of a closed switching element G, connect the main shaft 11 or, in the case of a closed switching element H, connect the carrier ST3 of the additional planetary gearset PG3 to the fifth gear plane R5. The output constant, in other words, the fifth gear plane R5 of the main gear HG, can thus be coupled by means of the fourth double switching element S4 either to the sun gear SR3 or to the carrier ST3 of the additional planetary gearset PG3, because the main shaft 11 is directly connected to the sun gear SR3 of the planetary gearset PG3. Thanks to the thus possible coupling of the electric engine 2 via the output constant to the carrier ST3 of the planetary gearset PG3, the fifth double switching element S5 becomes load-free and can be switched. The electric engine 6 thus supports the tractive force via the countershaft VW, so that the range group PG3 can be switched in a tractive force-supported manner. Another advantage of the coupling of the electric machine 2 to the carrier ST3 is that the speed of the countershaft VW during driving in the direct gear can be reduced, so as to reduce drag losses at the mountings and seals. Each of the double switching elements S1 to S4 can also be switched to neutral, so that it connects none of the mentioned elements to one another.

The gear 1 comprises the range group in the form of the planetary gearset PG3. The range group PG3 serves to duplicate the number of gears of the main gear HG. For this purpose, by means of the fifth double switching element S5, which is assigned to the range group PG3, in the case of a closed switching element L, the ring gear HR3 of the planetary gearset PG3 can be connected with a housing-fixed component or a housing part or with another rotationally fixed component of the transmission 1. A slow range is thus formed. In the case of a closed switching element S of the fifth double switching element S5, the ring gear HR3 of the planetary gearset PG3 can be connected with the output shaft 3 and thus also with the carrier ST3 of the planetary gearset PG3. The carrier ST3 is connected in a rotationally fixed manner to the output shaft 3. The components carrier ST3 and ring gear HR3 are thus locked with one another in the case of a closed switching element S and form a fast range. The double switching element S5 can also be switched to neutral.

The second planetary gearset PG2 of the drive arrangement 1 is arranged as a planetary stage between the electric engine 2 and the transmission input shaft 4. The electric engine 6 has the stator 9, which is connected in a rotationally fixed manner to a housing-fixed component, so that the stator 9 cannot take on any speed. The rotatably mounted rotor 8 of the electric engine 6 is permanently connected in a rotationally fixed manner to the planetary gearset set shaft of the planetary stage PG2 formed as a sun gear SR2 of the second planetary gearset PG2.

The carrier ST2 of the second planetary gearset PG2 is permanently connected in a rotationally fixed manner to the first transmission input shaft 4. The ring gear HR2 of the second planetary gearset PG2 can, as described in detail above, be connected via the three-way switching element S6, in the case of a closed switching element I, to the transmission input shaft 5, in the case of a closed switching element J it is lockable in a housing-fixed manner, and in the case of a closed switching element K it can be coupled to the ring gear HR1 of the first planetary gearset PG1.

By means of the arrangement of the electric engine 2 with the planetary stage PG2 on the transmission input shaft 4, the electric engine 6 is assigned to the first partial gear.

The transmission input shaft 5 is driven by the combustion engine 7. The combustion engine 7 is permanently connected or connectable to the second transmission input shaft 5.

Each partial gear is assigned switchable gears via the assigned gear planes R1 to R5. The first gear plane R1 and the second gear plane R2 of the main gear HG are assigned to the first transmission input shaft 4 and thus to the first partial gear of the man gear HG. A purely electric driving is thus possible via the two gears, which are formed by the two gear planes R1 and R2. Thanks to the range group PG3 four switchable purely electric gears are created. The third gear plane R3 and the fourth gear plane R4 of the main gear HG are assigned to the second transmission input shaft 5 and thus to the second partial gear of the main gear HG. The fifth gear plane R5 serves as an output constant for both partial gears of the main gear HG. Thanks to the partial gear coupling via the double switching element S2 in the case of a closed switching element C the combustion engine 7 and the electric engine 6 can nevertheless use the gears of the respective other partial gear. The electric engine 6 can however not use the third gear plane R3 of the main gear HG.

Thanks to the two partial gears, the combustion engine 7 and the electric engine 6 can be operated with different transmission ratios. It is thus possible to select for the combustion engine 7 and for the electric engine 6 operating points which are suitable depending on the driving situation. The electric engine 6 can in some cases also be fully uncoupled and be at a standstill and can thus avoid no-load losses. An uncoupling of the electric engine 6 is possible via the double switching elements S1 and S2, which must not connect the first transmission input shaft 4 to another component.

By means of the partial gear coupling via the double switching element S2 in the case of a closed switching element C, the combustion engine 7 can be connected to the electric engine 6, without a torque being conveyed to the output shaft 3. At least the double switching element S1 and the double switching element S3 of the main gear HG are not activated, but are instead in a neutral position. The combustion engine 7 can thus be started with the electric engine 6 or power can be generated in neutral, i.e. independent of the driving speed, in other words even at a standstill. The combustion engine 7 thereby drives the electric engine 6. The electric engine 6 functions as a generator.

FIG. 1 shows only the top half of the gear set of transmission 1 which is symmetrical to the axis of the transmission input shafts 4, 5, of the main shaft 11 and the output shaft 3. The mirror imaging on this axis results in a variant with two countershafts VW, which serve to distribute the power. The gear set is however functionally identical in the embodiment variant to only one countershaft VW. This means that the countershaft VW together with the associated fixed gears are not mirrored.

The embodiment of FIG. 4 allows realization of a start-up function known as EDSU, Electro-Dynamic Start-Up. The electric engine 6 can be used alone or only to support the combustion engine 7 for start-up and acceleration.

In a purely electric start-up a higher starting torque can be provided via the second planetary gearset PG2 functioning as a constant transmission ratio. To permit electrodynamic start-up, on the three-way switching element S6 the switching element I must be closed for a forwards start-up direction and the switching element K must be closed for a reverse start-up direction. The transmission 2 is then in the EDSU mode. Furthermore, a gear of the first partial gear, which is assigned to the transmission input shaft 4, must be engaged and the second partial gear must be switched to neutral, without transmission of torque. The first gear of the transmission 1 is preferably assigned to the first gear plane R1. The first gear plane R1 is assigned to the first partial gear.

Thus for the electrodynamic start-up the first double switching element S1 can be used in the case of a closed switching element A and in the subsequent force flow for the first gear the fourth double switching element S4 can be used in the case of a closed switching element G and the fifth double switching element S5 in the case of a closed switching element L. A force flow is thus prepared in the first gear from the transmission input shaft 4 via the first gear plane R1, the countershaft VW, the output constant R5, the main shaft 11 and the range group PG3 in the slow range. In the case of a vehicle standstill the combustion engine 7 rotates e.g. with the idling speed. The electric engine 6 rotates backwards for a forwards start-up in the case of a closed switching element I, the carrier ST2 of the planetary gearset PG2 is at a standstill. In the case of a closed switching element K for the reverse start-up, by means of the planetary gearset PG1 a speed reversal and a speed deceleration take place, the electric engine 6 rotates forwards and the carrier ST2 of the planetary gearset PG2 is at a standstill. The torque ratios at the planetary gearset PG2 are constant. The torque of the combustion engine 7 and the torque of the electric engine 6 are added at the carrier ST2 to those of the planetary gearset PG2. During the electrodynamic forwards start-up in the case of a closed switching element I the speed of the electric engine 6 changes up to the locking circulation at the planetary stage PG2, with the start-up then being able to be ended in that at the second double switching element S2 the switching element C is closed and the planetary stage PG2 is thereby locked. The electrodynamic start-up in the forwards start-up direction and for the reverse start-up direction can also take place at a higher gear of the gear 2, namely when higher start-up speeds are desired. These gears are assigned to the first partial gear of the main gear HG.

If the gear 1 is operated in the EDSU mode, an electrodynamic switching (EDS) is possible as a load switching function. The switching element I is preferably closed on the three-way switching element S6. A gear assigned to the first partial gear and thus to the transmission input shaft 4 must be engaged. This gear serves as a support gear, by means of which the force flow is conveyed during the load switching. The support gear can be identical to the actual gear or to a target gear. However another gear of the first partial gear can also be used.

The switching process begins with a load take-over phase. At the combustion engine 7 and at the electric engine 6 the torques are set such that it corresponds to the stationary gear transmission of the planetary gearset stage PG2. Consequently there is only a force flow via the carrier ST2 of the planetary gearset stage PG2 and the support gear. All other switching elements of the transmission 2 become load-free. The switching elements of the actual gear which have become load-free are disengaged. The speed of the combustion engine 7 and of the electric engine 6 is controlled such that the switching element to be engaged of the target gear becomes synchronous. If a synchronicity is obtained, the switching element of the target gear is engaged. The switching operation is thus completed and the load on the electric engine 6 can be reduced if necessary. The EDS switching process has the advantage that the switching element which is being switched to of the target gear is synchronized by the cooperation of the electric engine 6 and the combustion engine 7, with the electric engine 6 being easily controllable. An additional advantage of the EDS switching process is that a high tractive force can be obtained because the torques of the combustion engine 6 and of the electric engine 7 are added together at the second planetary gearset PG2.

With the transmission of FIG. 1 it is also possible to realize a function known as ISG, Integrated Starter Generator, in which the combustion engine 7 can be started and accelerated via the electric engine 6 and the electric engine 6 can also be used as a generator. In the ISG mode the switching element J is closed at the three-way switching element S6 and connects the ring gear HR2 to a housing-fixed component.

The gear set of the transmission 2 of FIG. 4 in particular serves to provide 10 gears from the perspective of the combustion engine 7. When the combustion engine 7 guides a force flow over the second partial gear, over the solid shaft 5, a gear can then be preselected or the partial gears can be coupled in the force flow-free first partial gear, over the solid shaft 4. The preselection gear is preselected for the combustion engine 7 and is at the same time already active for the electric engine 6.

The power flow in a first gear from the perspective of the combustion engine 7 is preferably conveyed to the output shaft 3 via the transmission input shaft 5, the second double switching element S2 in the case of a closed switching element C, the first double switching element S1 in the case of a closed switching element A, the first gear plane R1, the countershaft VW, the output constant R5, the fourth double switching element S4 in the case of a closed switching element G, the range group PG3 switched to the slow range. The power flow in a second gear from the perspective of the combustion engine 7 is conveyed to the output shaft 3 via the transmission input shaft 5, the second double switching element S2 in the case of a closed switching element D, the third gear plane R3, the countershaft VW, the output constant R5, the fourth double switching element S4 in the case of a closed switching element G, and the range group switched to the slow range PG3. Via the first double switching element S1 in the case of a closed switching element A both the first gear and thus the first gear plane R1 and also, in the case of a closed switching element B, the fourth gear and thus the second gear plane R2 can be preselected. The preselected gears are assigned to the first partial gear. The power flow in a third gear from the perspective of the combustion engine 7 is conveyed to the output shaft 3 via the transmission input shaft 5, the third double switching element S3 in the case of a closed switching element E, the fourth gear plane R4, the countershaft VW, the output constant R5, the fourth double switching element S4 in the case of a closed switching element G, and the range group PG3 switched to the slow range. Via the first double switching element S1 in the case of a closed switching element B, the fourth gear and thus the second gear plane R2 can be preselected. The power flow in a fourth gear from the perspective of the combustion engine 7 is conveyed to the output shaft 3 via the transmission input shaft 5, the second double switching element S2 in the case of a closed switching element C, the transmission input shaft 4, the first double switching element S1 in the case of a closed switching element B, the second gear plane R2, the countershaft VW, the output constant R5, the fourth double switching element S4 in the case of a closed switching element G, and the range group PG3 switched to the slow range.

The power flow in a fifth gear from the perspective of the combustion engine 7 is conveyed to the output shaft 3 via the transmission input shaft 5, the third double switching element S3 in the case of a closed switching element F, and the range group PG3 switched to the slow range. The fourth gear can be preselected via the first double switching element S1 in the case of a closed switching element B and via the fourth double switching element S4 in the case of a closed switching element G. Alternatively, a ninth gear can be preselected via the first double switching element S1 in the case of a closed switching element B and via the fourth double switching element S4 in the case of a closed switching element H. A sixth gear can likewise be preselected via the first double switching element S1 in the case of a closed switching element A and via the fourth double switching element S4 in the case of a closed switching element H. The power flow in a sixth gear from the perspective of the combustion engine 7 is conveyed to the output shaft 3 via the transmission input shaft 5, the second double switching element S2 in the case of a closed switching element C, the transmission input shaft 4, the first double switching element in the case of a closed switching element A, the first gear plane R1, the countershaft VW, the output constant R5, the fourth double switching element S4 in the case of a closed switching element H and via the range group PG3 switched to the fast range. The power flow in a seventh gear from the perspective of the combustion engine 7 is conveyed to the output shaft 3 via the transmission input shaft 5, the second double switching element S2 in the case of a closed switching element D, the third gear plane R3, the countershaft VW, the output constant R5, the fourth double switching element S4 in the case of a closed switching element H and via the range group PG3 switched to the fast range. By means of the first double switching element S1 in the case of a closed switching element A, the sixth gear can be preselected or, by means of the first double switching element S1 in the case of a closed switching element B, the ninth gear can be preselected. The power flow in an eighth gear from the perspective of the combustion engine 7 is conveyed to the output shaft 3 via the transmission input shaft 5, the third double switching element S3 in the case of a closed switching element E, the fourth gear plane R4, the countershaft VW, the output constant R5, the fourth double switching element S4 in the case of a closed switching element H and via the range group PG3 switched to the fast range. The ninth gear can be preselected by means of the first double switching element S1 in the case of a closed switching element B.

The power flow in the ninth gear from the perspective of the combustion engine 7 is conveyed to the output shaft 3 via the transmission input shaft 5, the second double switching element in the case of a closed switching element C, the transmission input shaft 4, the first double switching element S1 in the case of a closed switching element B, the second gear plane R2, the countershaft VW, the output constant R5, the fourth double switching element S4 in the case of a closed switching element H and via the range group switched to the fast range, which range group is provided by the first planetary gearset PG3. The power flow in a tenth gear from the perspective of the combustion engine is conveyed to the output shaft 3 via the transmission input shaft 5, the third double switching element S3 in the case of a closed switching element F, the main shaft 11 and via the range group PG3 switched to the fast range. It is advantageous that the second double switching element S2 is also switched in the case of a closed switching element C, because the first transmission input shaft 4 is thus guided with a defined speed, here the speed of the transmission input shaft 5. The ninth gear can be connected upstream via the first double switching element S1 in the case of a closed switching element B and the fourth double switching element S4 in the case of a closed switching element H. It is however also possible to connect upstream the sixth gear via the first double switching element S1 in the case of a closed switching element A and the second double switching element S2 in the case of a closed switching element C. This permits a reduction of the countershaft speed. The preselection of the first double switching element S1 in the case of a closed switching element A also permits in the tenth gear a standstill of the electric engine 2 and of the countershaft VW. In the sixth, seventh, eighth and ninth gear of the transmission 2 the fifth double switching element S5 could also remain closed in the first switching position L or in the case of a closed switching element L instead of in the second switching position S or instead of in the case of a closed switching element S, because the fifth double switching element S5 is load-free in both switching positions L and S when the force flow is conveyed via the fourth double switching element S4 in the case of a closed switching element H directly to the carrier ST3 of the first planetary gearset PG3. Due to the speed ratios at the range group PG3 it is however advantageous to carry out the change from the first switching position L of the fifth double switching element S5 to the second switching position S as early as possible.

The switching of the range group PG3 in a tractive force interruption-free manner generally takes place during the change from the fifth gear to the sixth gear. In the fifth gear in the case of combustion engine driving or hybrid driving in the ISG mode, this is switched via a direct gear in the slow range group PG3. The third double switching element S3 is located in its switching position F and the fifth double switching element is located in its first switching position L. The electric engine 6 is still functioning in the fourth gear due to the past history, with the first double switching element S1 being located in its switching position B and the double switching element S4 being located in its switching position G. In order to now switch to the sixth gear in a tractive force interruption-free manner, the following process steps are realized: When there is load on the electric engine 6, a load reduction takes place here. The combustion engine 7 takes on the load. The fourth double switching element S4 can then be opened from the switching position G. The switching position H of the fourth double switching element S4 is actively synchronized via the speed control of the electric engine 6. For this purpose, the speed of the electric engine 6 must be reduced. The speed reduction is realized by the factor of the transmission of the range group PG3. The fourth double switching element S4 can then be switched to the switching position H in a load-free manner. The ninth gear is transitionally engaged in this state, because the first double switching element S1 is still in its switching position B. It can now be opened in a load-free manner. The switching position A of the first double switching element S1 is now actively synchronized by means of speed control of the electric engine 6. For this purpose the speed of the electric engine 6 must be increased to the target speed level of the sixth gear. The speed increase is realized by the ratio of the gear transmission of both gears which are assigned to the first transmission input shaft. Thus the first double switching element S1 can be brought into the switching position A in a load-free manner, with the connection gear, the sixth gear, being simultaneously preselected. A load transfer then takes place from the combustion engine 7 to the electric engine 6. This means that only the electric engine 6 supports the tractive force in the target gear, the sixth gear. Once the combustion engine 7 is load free, the switching position F of the third double switching element S3 is opened.

Optionally, a change of the fifth double switching element S5 from the switching position L to its switching position S can now take place while the switching position F of the third double switching element S3 is opened. This provides the advantage that only the main shaft 11 and thus a low inertia mass acts on the sun gear SR3 of the first planetary gearset PG3. The synchronization takes place via the double switching element S5 itself, which is designed synchronized. The switching position S of the fifth double switching element S5 can then be closed. The switching position S cannot be actively synchronized with the combustion engine 7 because the combustion engine 7 cannot reduce the speed sufficiently, as the speed level of the tenth gear (the third double switching element S3 and the fifth double switching element S5 respectively in the switching position F and S) would be required here, although the sixth gear is the target gear. The change from the switching position L of the fifth double switching element S5 into the switching position S of the fifth double switching element S5 at this point is, as already stated, advantageous but not absolutely necessary. The change could also take place outside of the switching from the fifth gear to the sixth gear at a later point in time. The fifth double switching element S5 would then remain for the time being in the switching position L.

Immediately after the switching position F of the third double switching element S3 is opened, which may mean simultaneously with the just mentioned step, the combustion engine 7 synchronizes with the target speed of the sixth gear. The switching position C of the second double switching element S2 is thus synchronized and can then be closed in a load-free manner. Thus the sixth gear is engaged and the switching operation is completed. The load transfer from the electric engine 6 to the combustion engine 7 can then take place in accordance with the operating strategy. To go from the fifth gear to the sixth gear, both the fourth double switching element S4 and the first double switching element S1 must be switched over. Firstly the fourth double switching element S4 is changed and only then is the first double switching element S1 changed. Thus the electric engine 6 firstly has its speed reduced and can synchronize with a high torque.

In the case of the transmission 2 of FIG. 4, the switching elements A, B, C, D, E, F, G and H are unsynchronized, form-fitting switching elements. The switching elements I, J and K of the drive arrangement 1 are likewise unsynchronized, form-fitting switching elements. The switching elements L and S of the transmission 2 are however synchronized, form-fitting switching elements. A, B, G, H, I, J and K can be actively synchronized via a speed-controlled electric engine 6. C, D, E, F can be actively synchronized via a speed-controlled combustion engine 7, or via the above-described, electrodynamic switching (EDS).

DRIVE ARRANGEMENT 1. transmission
2. output shaft
3. transmission input shaft
4. transmission input shaft
5. electric engine
6. combustion engine
7. rotor
8. stator
9. actuator
10. main shaft
A switching element
B switching element
C switching element
D switching element
E switching element
F switching element
G switching element
H switching element
I switching element
J switching element
K switching element
HG main gear
PG1 planetary gearset
SR1 sun gear
ST1 carrier
HR1 ring gear
PG2 planetary gearset
SR2 sun gear
ST2 carrier
HR2 ring gear
PG3 planetary gearset
SR3 sun gear
ST3 carrier
HR3 ring gear
R1 gear plane
R2 gear plane
R3 gear plane
R4 gear plane
R5 gear plane
S1 double switching element
S2 double switching element
S3 double switching element
S4 double switching element
S5 double switching element
S6 three-way switching element

The invention claimed is:

1. A drive arrangement for a hybrid vehicle having a hybrid drive with a combustion engine, an electric engine and a transmission with first and second transmission input shafts and an output shaft,
   wherein the drive arrangement comprises at least:
   a first planetary gearset comprising three elements and the three elements of the first planetary gearset are a carrier, a sun gear and a ring gear, a first element of the first planetary gearset is connected in a rotationally fixed manner to the first transmission input shaft, and a second element of the first planetary gearset is connected in a fixed manner to a housing;
   a second planetary gearset comprising three elements and the three elements of the second planetary gearset are a carrier, a sun gear and a ring gear, a first element of the second planetary gearset is connected in a rotationally fixed manner to the electric engine, and a second element of the second planetary gearset is connected in a rotationally fixed manner to the second transmission input shaft; and
   at least first, second, and third switching elements,
      when the first switching element is engaged, a third element of the second planetary gearset is connected in a fixed manner to the housing;
      when the second switching element is engaged, the third element of the second planetary gearset is connected, in a rotationally fixed manner, to the first transmission input shaft, to which the first element of the first planetary gearset is also connected in a rotationally fixed manner;

when the third switching element is engaged, the third element of the second planetary gearset is connected, in a rotationally fixed manner, to a third element of the first planetary gearset.

2. The drive arrangement according to claim 1, wherein the first element of the first planetary gearset is the sun gear of the first planetary gearset, the second element of the first planetary gearset is the carrier of the first planetary gearset and the third element of the first planetary gearset is the ring gear of the first planetary gearset.

3. The drive arrangement according to claim 1, wherein the first element of the second planetary gearset is the sun gear of the second planetary gearset, the second element of the second planetary gearset is the carrier of the second planetary gearset and the third element of the second planetary gearset is the ring gear of the second planetary gearset.

4. The drive arrangement according to claim 1, wherein the first switching element, the second switching element and the third switching element are actuatable via a common actuator such that only one of the first, the second and the third switching elements is engaged at a time.

5. The drive arrangement according to claim 1, wherein the first switching element, the second switching element and the third switching element are arranged such that the second switching element is located between the first switching element and the third switching element.

6. The drive arrangement according to claim 5, wherein, starting from an engaged switching element position of the first switching element, firstly an engaged switching element position of the second switching element must be passed through before an engaged switching element position of the third switching element is reached.

7. The drive arrangement according to claim 1, wherein the first switching element, the second switching element and the third switching element are arranged such that the first switching element is located between the second switching element and the third switching element.

8. The drive arrangement according to claim 7, wherein, starting from an engaged switching element position of the second switching element, firstly an engaged switching element position of the first switching element must be passed through before a closed switching element position of the third switching element can be reached.

9. The drive arrangement according to claim 8, wherein there are three engaged switching element positions and two neutral switching element positions for the first switching element, the second switching element and the third switching element.

10. The drive arrangement according to claim 1, further comprising a fourth switching element, and when the fourth switching element is engaged, the first and the second transmission input shafts are coupled to one another in a rotationally fixed manner.

11. A drive train for a hybrid vehicle comprising
a hybrid drive having a combustion engine and an electric engine;
a transmission having first and second transmission input shafts and an output shaft; and
a drive arrangement comprising
a first planetary gearset comprising three elements and the three elements of the first planetary gearset are a carrier, a sun gear and a ring gear, a first element of the first planetary gearset is connected in a rotationally fixed manner to the first transmission input shaft, and a second element of the first planetary gearset is connected to a housing in a fixed manner;
a second planetary gearset comprising three elements and the three elements of the second planetary gearset are a carrier, a sun gear and a ring gear, a first element of the second planetary gearset is connected in a rotationally fixed manner to the electric engine, and a second element of the second planetary gearset is connected in a rotationally fixed manner to the second transmission input shaft; and
at least first, second, and third switching elements,
when the first switching element is engaged, a third element of the second planetary gearset is connected to the housing in a fixed manner;
when the second switching element is engaged, the third element of the second planetary gearset is connected, in a rotationally fixed manner, to the first transmission input shaft, to which the first element of the first planetary gearset is also connected in a rotationally fixed manner; and
when the third switching element is engaged, the third element of the second planetary gearset is connected, in a rotationally fixed manner to a third element of the first planetary gearset.

12. The drive train according to claim 11, wherein the combustion engine is either continuously connected to the first transmission input shaft or is connectable, via a separating clutch, to the first transmission input shaft.

13. The drive train according to claim 11, wherein the transmission comprises a main gear comprising two partial transmissions that are connected in parallel with the first and the second transmission input shafts and the output shaft,
the main gear further comprises a first gear plane, a second gear plane, a third gear plane, a fourth gear plane and a fifth gear plane,
the transmission further comprising a first double switching element, a second double switching element, a third double switching element, a fourth double switching element and a fifth double switching element,
the transmission comprises a range group planetary gearset that is connected to the main gear, the fourth double switching element, when a first switching element of the fourth double switching element is engaged, connects the fifth gear plane and a first element of the range group planetary gearset in a rotationally fixed manner, the fifth double switching element couples a second element of the range group planetary gearset to the output shaft, when a first switching element of the fifth double switching element is engaged, and, the fifth double switching element locks the second element of the range group planetary gearset to the housing, in a fixed manner, when another switching element of the fifth double switching element is engaged.

14. The drive train according to claim 13, wherein the fourth double switching element, when another switching element of the fourth double switching element is engaged, connects the fifth gear plane of the main gear to a main shaft of the transmission, and a third element of the range group planetary gearset is coupled, in a rotationally fixed manner, to the main shaft of the transmission.

15. The drive train according to claim 13, wherein the main gear comprises at least one countershaft, with all toothed wheels on the countershaft being designed as fixed gears, each of the first, the second, the third, the fourth and the fifth gear planes are designed as forward gear planes, and a reverse gear is generated via a rotational direction reversal of the electric engine, and all of the first, the second, the third and the fourth switching elements in the main gear are designed as unsynchronized claw switching elements.

16. A drive arrangement for a hybrid vehicle, the drive arrangement comprising:
 a combustion engine and an electric engine;
 a transmission having first and second input shafts and an output shaft;
 first and second planetary gearsets, each of the first and the second planetary gearsets comprising three elements, and the three elements being a carrier, a sun gear and a ring gear;
 a first element of the first planetary gearset is rotationally fixed to the first input shaft so as to rotate in unison therewith, and a second element of the first planetary gearset is rotationally fixed to a housing;
 a first element of the second planetary gearset is rotationally fixed to a rotor of the electric engine so as to rotate in unison therewith, and a second element of the second planetary gearset is rotationally fixed to the second input shaft so as to rotate in unison therewith;
 first, second and third switching elements,
  the first switching element, when engaged, coupling a third element of the second planetary gearset to the housing in a fixed manner,
  the second switching element, when engaged, rotationally coupling the third element of the second planetary gearset to the first input shaft, and
  the third switching element, when engaged, rotationally coupling the third element of the second planetary gearset to a third element of the first planetary gearset.

* * * * *